United States Patent
Yoon et al.

(10) Patent No.: US 12,248,087 B2
(45) Date of Patent: *Mar. 11, 2025

(54) DEVICE POSITIONING

(71) Applicant: NOKIA SOLUTIONS AND NETWORKS OY, Espoo (FI)

(72) Inventors: Daejung Yoon, Massy (FR); Diomidis Michalopoulos, Munich (DE); Philippe Sehier, Saint Germain en Laye (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,331

(22) Filed: Dec. 27, 2022

(65) Prior Publication Data

US 2023/0184879 A1 Jun. 15, 2023

Related U.S. Application Data

(63) Continuation of application No. 17/490,184, filed on Sep. 30, 2021, now Pat. No. 11,561,277.

(30) Foreign Application Priority Data

Sep. 30, 2020 (FI) .................... 20205951

(51) Int. Cl.
*G01S 5/00* (2006.01)
*G01S 5/02* (2010.01)
*G01S 5/10* (2006.01)

(52) U.S. Cl.
CPC .............. *G01S 5/10* (2013.01); *G01S 5/0036* (2013.01); *G01S 5/02216* (2020.05); *G01S 5/02685* (2020.05)

(58) Field of Classification Search
CPC ...... G01S 5/10; G01S 5/02216; G01S 5/0036; G01S 5/02685
See application file for complete search history.

(56) References Cited

U.S. PATENT DOCUMENTS

| 9,042,913 B2 | 5/2015 | Moeglein et al. |
| 2016/0044551 A1 | 2/2016 | Frenger et al. |

(Continued)

FOREIGN PATENT DOCUMENTS

| CN | 103384376 A | 11/2013 |
| CN | 106416368 A | 2/2017 |

(Continued)

OTHER PUBLICATIONS

Notification of Second Office Action dated Jan. 19, 2023 corresponding to Chinese Patent Application No. 2021111650713, with English Summary thereof.

(Continued)

*Primary Examiner* — Muthuswamy G Manoharan
(74) *Attorney, Agent, or Firm* — SQUIRE PATTON BOGGS (US) LLP

(57) ABSTRACT

An apparatus, method and computer program is described. The method can include receiving a first measurement report from a first communication node of a mobile communication system. The first measurement report can include downlink measurement data generated at a user device in response to a positioning reference signal sent by the first communication node. The method can further include receiving a second measurement report from the first communication node. The second measurement report can include uplink measurement data generated at the first communication node in response to an uplink reference signal sent by the user device. The method can also include determining an integrity of the measurement data based on a comparison of said uplink and downlink measurement data and setting an (Continued)

integrity verification notification in accordance with the determined integrity.

17 Claims, 11 Drawing Sheets

(56) References Cited

U.S. PATENT DOCUMENTS

| | | | |
|---|---|---|---|
| 2019/0074946 A1* | 3/2019 | Xue | H04L 5/0082 |
| 2020/0137715 A1 | 4/2020 | Edge et al. | |
| 2020/0236507 A1 | 7/2020 | Manolakos et al. | |
| 2020/0267683 A1 | 8/2020 | Edge et al. | |
| 2022/0191815 A1* | 6/2022 | Berggren | H04L 5/0094 |

FOREIGN PATENT DOCUMENTS

| | | | |
|---|---|---|---|
| CN | 110022523 A | 7/2019 | |
| CN | 110447178 A | 11/2019 | |
| EP | 2846574 A1 | 3/2015 | |
| TW | 202027545 A | 7/2020 | |
| WO | WO-2017190274 A1 * | 11/2017 | H04L 5/0048 |
| WO | 2019/134563 A1 | 7/2019 | |
| WO | 2020/069083 A1 | 4/2020 | |
| WO | 2020/150589 A1 | 7/2020 | |
| WO | 2020/167073 A1 | 8/2020 | |
| WO | 2020/167960 A1 | 8/2020 | |
| WO | WO-2020198271 A1 * | 10/2020 | G01S 5/0236 |

OTHER PUBLICATIONS

First Office Action dated Aug. 22, 2022 corresponding to Chinese Patent Application No. 2021-11165071.3 with search report. No copy provided, per MPEP 609. Copy submitted in parent U.S. Appl. No. 17/490,184.

Extended European Search Report received for corresponding European Patent Application No. 21199800.0, dated May 3, 2022. No copy provided, per MPEP 609. Copy submitted in parent U.S. Appl. No. 17/490,184.

Office Action received for corresponding Finnish Patent Application No. 20205951, dated Feb. 16, 2022. No copy provided, per MPEP 609. Copy submitted in parent U.S. Appl. No. 17/490,184.

"3rd Generation Partnership Project; Technical Specification Group Radio Access Network; NR; Radio Resource Control (RRC) protocol specification (Release 16)," 3GPP TS 38.331, V16.1.0, Jul. 2020, pp. 1-906. No copy provided, per MPEP 609. Copy submitted in parent U.S. Appl. No. 17/490,184.

"3rd Generation Partnership Project; Technical Specification Group Radio Access Network; NG-RAN; NR Positioning Protocol A (NRPPa) (Release 16)," 3GPP TS 38.455, V16.0.0, Jul. 2020, pp. 1-60. No copy provided, per MPEP 609. Copy submitted in parent U.S. Appl. No. 17/490,184.

"3rd Generation Partnership Project; Technical Specification Group Radio Access Network; NG Radio Access Network (NG-RAN); Stage 2 functional specification of User Equipment (UE) positioning in NG-RAN (Release 16)," 3GPP TS 38.305, V16.1.0, Jul. 2020, pp. 1-114. No copy provided, per MPEP 609. Copy submitted in parent U.S. Appl. No. 17/490,184.

"New SID on NR Positioning Enhancements," 3GPP TSG RAN Meeting #86, RP-193237, Agenda: 9.1.1, Qualcomm Incorporated, Dec. 9-12, 2019, 4 pages. No copy provided, per MPEP 609. Copy submitted in parent U.S. Appl. No. 17/490,184.

"Receiver autonomous integrity monitoring," Wikipedia, Retrieved on Sep. 27, 2021, Webpage available at: https://en.wikipedia.org/wiki/Receiver_autonomous_integrity_monitoring. No copy provided, per MPEP 609. Copy submitted in parent U.S. Appl. No. 17/490,184.

"Report of email discussion [99bis#57][LTE/Positioning] Future phase support of SSR," 3GPP TSG-RAN WG2 Meeting #101-Bis, R2-1804428, Agenda: 9.8.2, u-blox AG, Apr. 16-20, 2018, pp. 1-22. No copy provided, per MPEP 609. Copy submitted in parent U.S. Appl. No. 17/490,184.

Roturier et al., "The SBAS Integrity Concept Standardised by ICAO. Application to EGNOS," European Space Agency, 2006, 7 pages. No copy provided, per MPEP 609. Copy submitted in parent U.S. Appl. No. 17/490,184.

Mi et al., "TDOA-based Sybil attach detection scheme for wireless sensor networks," Journal of Shanghai University, vol. 12, No. 1, 2008, pp. 66-70. No copy provided, per MPEP 609. Copy submitted in parent U.S. Appl. No. 17/490,184.

Capkun et al., "Secure Location Verification with Hidden and Mobile Base Stations," IEEE Transactions on Mobile Computing, vol. 7, No. 4, Apr. 2008, pp. 470-483. No copy provided, per MPEP 609. Copy submitted in parent U.S. Appl. No. 17/490,184.

Koh et al., "Geo-spatial Location Spoofing Detection for Internet of Things," arXiv, Mar. 28, 2017, pp. 1-21. No copy provided, per MPEP 609. Copy submitted in parent U.S. Appl. No. 17/490,184.

Office Action received for corresponding Finnish Patent Application No. 20205951, dated Apr. 27, 2021, 8 pages. No copy provided, per MPEP 609. Copy submitted in parent U.S. Appl. No. 17/490,184.

* cited by examiner

DEVICE POSITIONING

CROSS REFERENCE TO RELATED APPLICATION

This is a Continuation of U.S. patent application Ser. No. 17/490,184 filed Sep. 20, 2021, and which claims priority from Finnish Patent Application No. 20205951, dated Sep. 30, 2020. The contents of these applications are hereby incorporated by reference.

FIELD

This present specification relates to device positioning. In particular, the present specification relates to integrity in device positioning.

BACKGROUND

Although arrangements for estimating the position of a device, such as a user device, based on signals transmitted within a mobile communication system are known, there remains room for further developments in this field.

SUMMARY

In a first aspect, this specification describes an apparatus (such as a location management function) comprising means for performing: receiving a first measurement report from a first communication node of a mobile communication system, wherein the first measurement report includes downlink measurement data generated at a user device in response to a positioning reference signal sent by the first communication node; receiving a second measurement report from the first communication node, wherein the second measurement report includes uplink measurement data generated at the first communication node in response to an uplink reference signal (e.g. a sounding reference signal) sent by the user device; determining an integrity of the measurement data based on a comparison of said uplink and downlink measurement data; and setting an integrity verification notification in accordance with the determined integrity. The first communication node may be a serving base station of the user device.

The downlink measurement data may include downlink time delay or time of arrival data and the uplink measurement data includes uplink time delay or time of arrival data. Further, the means for performing determining the integrity of the measurement data may determine whether the uplink and downlink time delay or time of arrival data are consistent. The means for performing determining whether the downlink time delay or time of arrival and the uplink time delay or time of arrival data are consistent may comprise means for performing determining whether a difference between the downlink time delay or time of arrival and the uplink time delay or time of arrival is below a first threshold.

The uplink and downlink measurement data may include angle of arrival and angle of departure data. Furthermore, the means for performing determining the integrity of the measurement data may determine whether the angle of arrival and angle of departure data are consistent.

Some example embodiments further comprise receiving a third measurement report from a second communication node of the mobile communication system, wherein the third measurement report includes uplink measurement data generated at the second communication node in response to the uplink reference signal sent by the user device, wherein the first measurement report includes downlink measurement data generated at the user device in response to a positioning reference signal sent by the second communication node. The second communication node may be a neighbour base station of the user device.

Some example embodiment further comprise: determining (e.g. based on angle of arrival and/or angle of departure data) a first angle between the user device, the first communication node and the second communication node; determining (e.g. based on angle of arrival and/or angle of departure data) a second angle between the user device, the second communication node and the first communication node; determining (e.g. based on time delay data) a first distance between the first communication node and the user device; and determining (e.g. based on time delay data) a second distance between the second communication node and the user device, wherein the means for performing determining the integrity of the measurement data determines whether the first and second angles and the first and second distances are consistent. The means for performing determining the integrity of the measurement data may determine whether a difference between a ratio of the sine of the first angle and the second distance and a ratio of the sine of the second angle and the first distance is below a second threshold.

Some example embodiments further comprise: determining (e.g. based on angle of arrival and/or angle of departure data) a/the first angle between the user device, the first communication node and the second communication node; determining (e.g. based on angle of arrival and/or angle of departure data) a/the second angle between the user device, the second communication node and the first communication node; and determining a third angle between the first communication node, the user device and the second communication node, wherein the means for performing determining the integrity of the measurement data determines said integrity based on a sum of the first, second and third angles (e.g. by determining whether that sum, minus 180 degrees, is below a third threshold).

In some example embodiments, setting the integrity verification notification comprises setting an integrity verification notification signal (e.g. a flag).

Some example embodiments further comprise sending configuration instructions to the first communication node (and optionally to the second communication node) requesting said first and second measurement reports (and optionally the third measurement report).

Some example embodiments further comprise estimating a position of the user device based on an angles of arrival of transmissions from the user device at the first communication node and another communication node and the distance between the first communication node and said another communication node (e.g. the second communication node referred to above). The position estimate may be determined in the event that the integrity verification notification is set (e.g. data from the user device is deemed to be untrustworthy).

In a second aspect, this specification describes an apparatus (such as a communication node or a mobile communication system) comprising means for performing: transmitting a positioning reference signal; receiving a downlink measurement report from a user device, wherein the downlink measurement report include downlink measurement data generated at a user device in response to the positioning reference signal; sending a first measurement report to a server (e.g. a location management function), wherein the first measurement report includes said downlink measurement report; receiving an uplink reference signal transmission (e.g. a sounding reference signal) from the user device; generating an uplink measurement report including uplink measurement data generated in response to the received uplink reference signal; and sending a measurement report to a server, wherein the second measurement report includes said uplink measurement report.

In the first or the second aspect, the said means may comprise: at least one processor; and at least one memory including computer program code, the at least one memory and the computer program configured, with the at least one processor, to cause the performance of the apparatus.

In a third aspect, this specification describes a method comprising: receiving a first measurement report from a first communication node of a mobile communication system, wherein the first measurement report includes downlink measurement data generated at a user device in response to a positioning reference signal sent by the first communication node; receiving a second measurement report from the first communication node, wherein the second measurement report includes uplink measurement data generated at the first communication node in response to an uplink reference signal sent by the user device; determining an integrity of the measurement data based on a comparison of said uplink and downlink measurement data; and setting an integrity verification notification in accordance with the determined integrity.

The downlink measurement data may include downlink time delay or time of arrival data and the uplink measurement data includes uplink time delay or time of arrival data. Further, determining the integrity of the measurement data may comprise determining whether the uplink and downlink time delay or time of arrival data are consistent. Moreover, determining whether the downlink time delay or time of arrival and the uplink time delay or time of arrival data are consistent may comprise determining whether a difference between the downlink time delay or time of arrival and the uplink time delay or time of arrival is below a first threshold.

Determining the integrity of the measurement data may comprising determining whether an angle of arrival and an angle of departure data are consistent.

Some example embodiments further comprise receiving a third measurement report from a second communication node of the mobile communication system, wherein the third measurement report includes uplink measurement data generated at the second communication node in response to the uplink reference signal sent by the user device, wherein the first measurement report includes downlink measurement data generated at the user device in response to a positioning reference signal sent by the second communication node. The second communication node may be a neighbour base station of the user device.

Some example embodiment further comprise: determining (e.g. based on angle of arrival and/or angle of departure data) a first angle between the user device, the first communication node and the second communication node; determining (e.g. based on angle of arrival and/or angle of departure data) a second angle between the user device, the second communication node and the first communication node; determining (e.g. based on time delay data) a first distance between the first communication node and the user device; and determining (e.g. based on time delay data) a second distance between the second communication node and the user device, wherein the means for performing determining the integrity of the measurement data determines whether the first and second angles and the first and second distances are consistent. Determining the integrity of the measurement data may comprise determining whether a difference between a ratio of the sine of the first angle and the second distance and a ratio of the sine of the second angle and the first distance is below a second threshold.

Some example embodiments further comprise: determining (e.g. based on angle of arrival and/or angle of departure data) a/the first angle between the user device, the first communication node and the second communication node; determining (e.g. based on angle of arrival and/or angle of departure data) a/the second angle between the user device, the second communication node and the first communication node; and determining a third angle between the first communication node, the user device and the second communication node, wherein the means for performing determining the integrity of the measurement data determines said integrity based on a sum of the first, second and third angles (e.g. by determining whether that sum, minus 180 degrees, is below a third threshold).

In some example embodiments, setting the integrity verification notification comprises setting an integrity verification notification signal (e.g. a flag).

Some example embodiments further comprise sending configuration instructions to the first communication node (and optionally to the second communication node) requesting said first and second measurement reports (and optionally the third measurement report).

Some example embodiments further comprise estimating a position of the user device based on an angles of arrival of transmissions from the user device at the first communication node and another communication node and the distance between the first communication node and said another communication node (e.g. the second communication node referred to above). The position estimate may be determined in the event that the integrity verification notification is set (e.g. data from the user device is deemed to be untrustworthy).

In a fourth aspect, this specification describes a method comprising: transmitting a positioning reference signal; receiving a downlink measurement report from a user device, wherein the downlink measurement report include downlink measurement data generated at a user device in response to the positioning reference signal; sending a first measurement report to a server (e.g. a location management function), wherein the first measurement report includes said downlink measurement report; receiving an uplink reference signal transmission (e.g. a sounding reference signal) from the user device; generating an uplink measurement report including uplink measurement data generated in response to the received uplink reference signal; and sending a measurement report to a server, wherein the second measurement report includes said uplink measurement report.

In a fifth aspect, this specification describes computer-readable instructions which, when executed by computing apparatus, cause the computing apparatus to perform (at least) any method as described with reference to the third or fourth aspects.

In a sixth aspect, this specification describes a computer-readable medium (such as a non-transitory computer-readable medium) comprising program instructions stored thereon for performing (at least) any method as described with reference to the third or fourth aspects.

In a seventh aspect, this specification describes an apparatus comprising: at least one processor; and at least one memory including computer program code which, when executed by the at least one processor, causes the apparatus to perform (at least) any method as described with reference to the third or fourth aspects.

In an eighth aspect, this specification describes a computer program comprising instructions for causing an apparatus to perform at least the following: receiving a first measurement report from a first communication node of a mobile communication system, wherein the first measurement report includes downlink measurement data generated at a user device in response to a positioning reference signal sent by the first communication node; receiving a second measurement report from the first communication node, wherein the second measurement report includes uplink measurement data generated at the first communication node in response to an uplink reference signal sent by the user device; determining an integrity of the measurement data based on a comparison of said uplink and downlink measurement data; and setting an integrity verification notification in accordance with the determined integrity.

In a ninth aspect, this specification describes a computer program comprising instructions for causing an apparatus to perform at least the following: transmitting a positioning reference signal; receiving a downlink measurement report from a user device, wherein the downlink measurement report include downlink measurement data generated at a user device in response to the positioning reference signal; sending a first measurement report to a server (e.g. a location management function), wherein the first measurement report includes said downlink measurement report; receiving an uplink reference signal transmission (e.g. a sounding reference signal) from the user device; generating an uplink measurement report including uplink measurement data generated in response to the received uplink reference signal; and sending a measurement report to a server, wherein the second measurement report includes said uplink measurement report.

In a tenth aspect, this specification describes an apparatus comprising means (such as location management function) for receiving a first measurement report from a first communication node of a mobile communication system, wherein the first measurement report includes downlink measurement data generated at a user device in response to a positioning reference signal sent by the first communication node; means (such as the location management function) for receiving a second measurement report from the first communication node, wherein the second measurement report includes uplink measurement data generated at the first communication node in response to an uplink reference signal sent by the user device; means (such as control module or processor) for determining an integrity of the measurement data based on a comparison of said uplink and downlink measurement data; and means (such as an output of the location management function) for setting an integrity verification notification in accordance with the determined integrity.

In an eleventh aspect, this specification describes an apparatus comprising means such as a communication node of a mobile communication system) for transmitting a positioning reference signal; means (such as the communication node) for receiving a downlink measurement report from a user device, wherein the downlink measurement report include downlink measurement data generated at a user device in response to the positioning reference signal; means (such as an output of the communication node) for sending a first measurement report to a server, wherein the first measurement report includes said downlink measurement report; means (such as the communication node) for receiving an uplink reference signal transmission from the user device; means (such as a control module or processor) for generating an uplink measurement report including uplink measurement data generated in response to the received uplink reference signal; and means (such as the output of the communication node) for sending a measurement report to a server, wherein the second measurement report includes said uplink measurement report.

BRIEF DESCRIPTION OF THE DRAWINGS

Example embodiments will now be described, by way of example only, with reference to the following schematic drawings, in which.

DETAILED DESCRIPTION

Figure 1:
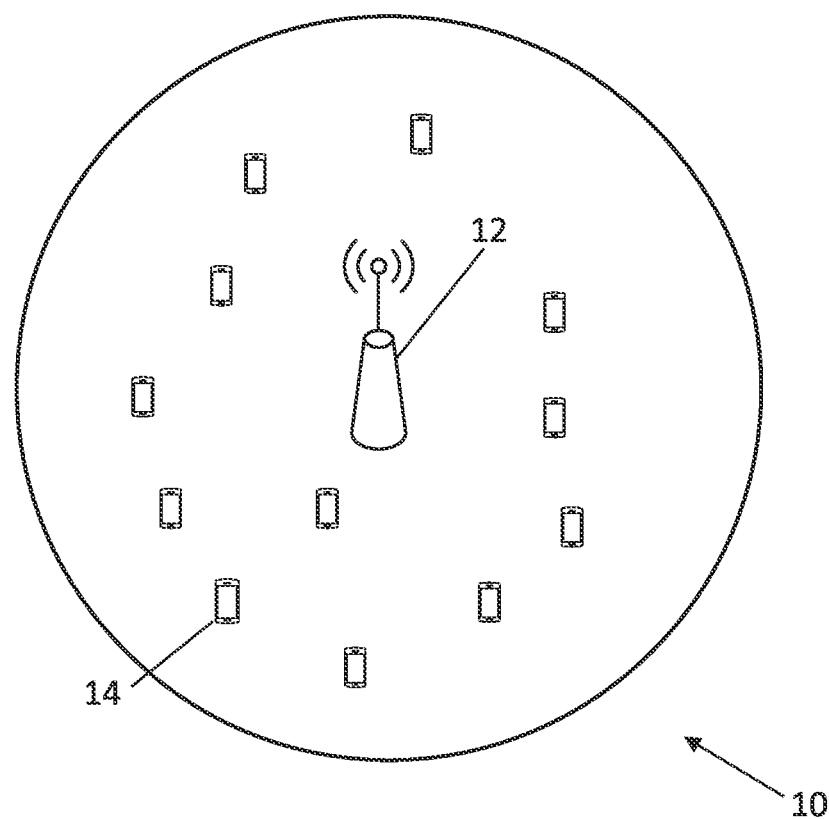
FIGS. 1 and 2 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

In 3GPP Rel-16 and Rel-17 NR positioning studies, mobile networks (MNs) may require locating the position of a user equipment (UE) to provide specific services or applications (location-based services/applications). To determine the position of a UE, 3GPP defines multiple methods. For example, a mobile network may estimate UE positioning using network-based methods requiring cooperation by the UE (UE-assisted positioning), or a position estimation may be performed by the UE (UE-based positioning).

A Location Management Function (LMF) may be used to coordinate positioning in the 5G NR system. According to the 3GPP description of new radio (NR) positioning enhancement, integrity (relating to the reliability and security of a positioning measurement) is a metric for positioning techniques that will be introduced in Rel-17 and beyond.

FIG. 1 is a block diagram of system, indicated generally by the reference numeral 10, in accordance with an example embodiment. The system 10 comprises a base station 12 and a plurality of user devices in communication with the base station. Positioning estimates regarding the user devices may be determined. In the system 10, the user device 14 is a malicious user device that may seek to provide false information about its position.

Positioning integrity includes mobile network managements on positioning measurement accuracy and also managements against malicious attacks disturbing positioning measurements or positioning-related service. For example, integrity diagnosis may be used by a user device or a positioning server to determine whether positioning information is reliable or not. If the integrity check declares measurements to be unreliable, such measurements should not be used by the application or the user. Also, a malicious UE (such as the user device 14 in the system 10) having hacking intentions may attempt to transmit jamming signals or generate fake measurements. Such issues may be relevant to security, since there are application programmes using the positioning information as a security key. Therefore, integrity diagnosis may be important for many applications to provide positioning in secured channels.

As positioning-based application services are introduced in 4G/5G systems, positioning information is generally becoming more important. In order to support such services, accurate positioning measurements with high integrity and security may be required.

Figure 2:
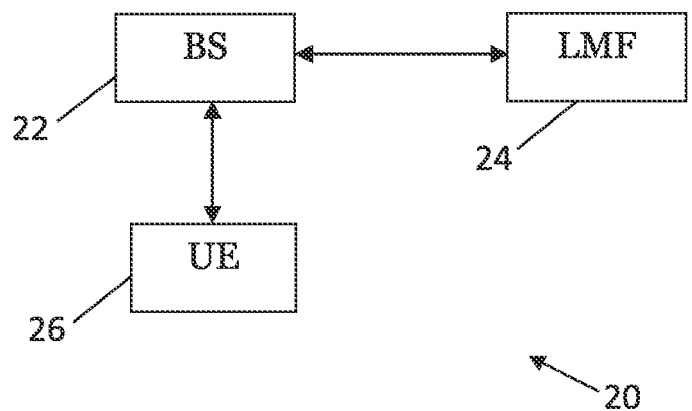

FIG. 2 is a block diagram of system, indicated generally by the reference numeral 20, in accordance with an example embodiment. The system 20 comprises a base station 22 (such as the base station 12 described above), a location management function (LMF) 24 and a user device (UE) 26. The base station 12 is in two-way communication with both the LMF 24 and the user device 26. The LMF 24 includes policies for checking accuracy and integrity of measurement data relating the user device 26.

Integrity determination can be important for many reasons. First, wide distribution of measurement error in a radio side can cause localization inaccuracy. Such measurements error may happen in various ways. It can be due to multiple path channel propagations or noisy channels, or intentional and unintentional interferences include positioning jamming and interfering signals, resulting in measurement errors. Second, although it may not know a source of the measurement error, when the positioning service is used for security applications, prediction capabilities of screening out inaccurate measurements or detection of the presence of malicious UEs may be required. This may be the responsibility of all network nodes (such as the base station 22, the LMF 24). Third, if a network senses suspicious measurements or behaviours, a malicious UE may seek to impersonate true UE positioning, and may generate erroneous measurements with malicious intention. This threat is valid for the location methods relying on a training database. Such a training database is typically populated with data collected by the 5G network and relevant parts of it are then transferred to a mobile device for the positioning purpose. Errors, for example due to data from malicious user devices, can reduce the accuracy of the transmitted database, and thus the accuracy and robustness of the location.

Figure 3:
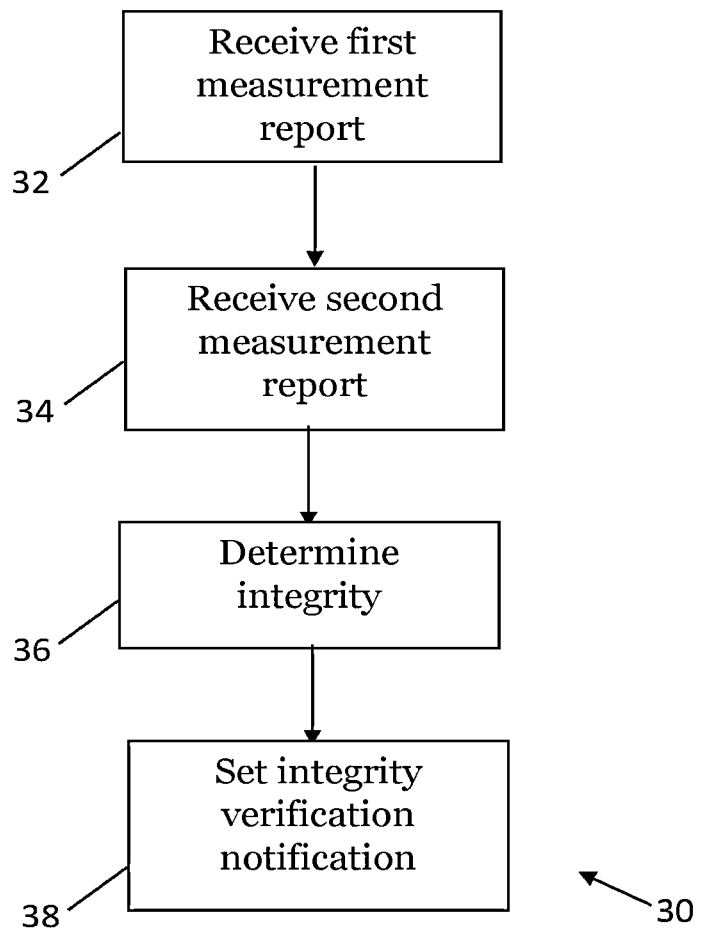
FIG. 3 is a flow chart showing an algorithm in accordance with an example embodiment.

FIG. 3 is a flow chart showing an algorithm, indicated generally by the reference numeral 30, in accordance with an example embodiment.

The algorithm 30 starts at operation 32 where a first measurements report is received at a server (such as the LMF 24) from a first communication node (such as the base station 22) of a mobile communication system. The first measurement report may include downlink measurement data generated at a user device (such as the user device 26) in response to a positioning reference signal sent by the first communication node.

At operation 34, a second measurement report is received at the server from the first communication node. The second measurement report may include uplink measurement data generated at the first communication node in response to an uplink reference signal (e.g. a sounding reference signal) sent by the user device.

At operation 36, an integrity of the measurement data is determined based on a comparison of said uplink and downlink measurement data.

Finally, at operation 38, an integrity verification notification (such as a flag) is set by the server, in accordance the integrity determined in the operation 36.

Figure 4:
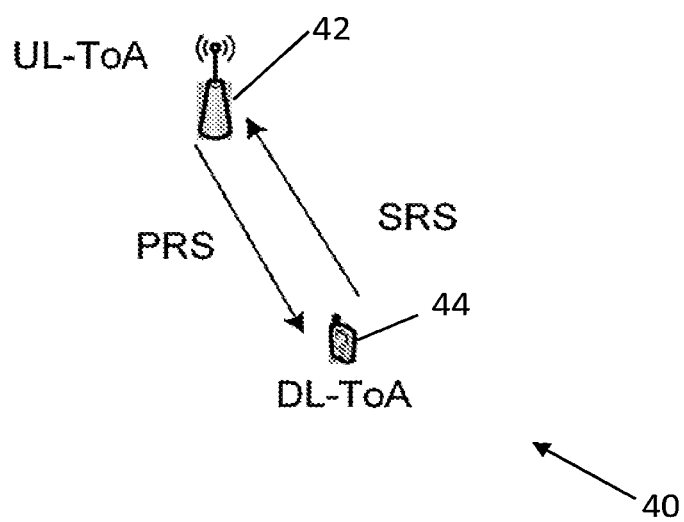
FIGS. 4 and 5 are block diagrams of systems in accordance with example embodiments.

FIG. 4 is a block diagram of system, indicated generally by the reference numeral 40, in accordance with an example embodiment. The system 40 may be used to implement the algorithm 30 described above.

The system 40 comprises a first communication node 42 (such as the base station 22 described above) and a first user device 44 (such as the user device 26 described above).

The user device 44 generates downlink measurement data in response to a positioning reference signal (PRS) sent by the first communication node 42. The downlink measurement data may be provided as the first measurement report of the operation 32 described above. Similarly, the communication node 42 generates uplink measurement data in response to a sounding reference signal (SRS) sent by the user device 44. The uplink measurement data may be provided as the second measurement report of the operation 34 described above.

The downlink measurement data may include downlink time delay or time of arrival data that is a measure of the time delay between a signal being transmitted by the communication node 42 and being received at the user device 44. Similarly, the uplink measurement data may include uplink time delay or time of arrival data that is a measure of the time delay between a signal being transmitted by the user device and being received at the communication node. The operation 36 of the algorithm 30 may determine integrity by determining whether the uplink and downlink time delay or time of arrival data are consistent.

By way of example, in an observed time difference of arrival algorithm (OTDoA), a reference signal time difference (RSTD) may be measured by the user device 44, while uplink time difference of arrival (UTDoA) may include the reporting of absolute time stamps at a gNB receiver (such as the first communication node 42). An LMF may then calculate a reference signal time difference (RSTD) using the UL time stamps as time difference between serving cell and a neighboring gNB (i.e. $\Delta t_{UL} = t_{gNB} - t_{serving}$).

In such as arrangement, the operation 38 may set the verification notification based on the following formula:

$$\text{verification flag} = \text{boolean}(|\Delta t_{DL} - \Delta t_{UL}| < \varepsilon) \qquad (1)$$

where $\varepsilon$ is a threshold of acceptance.

Figure 5:
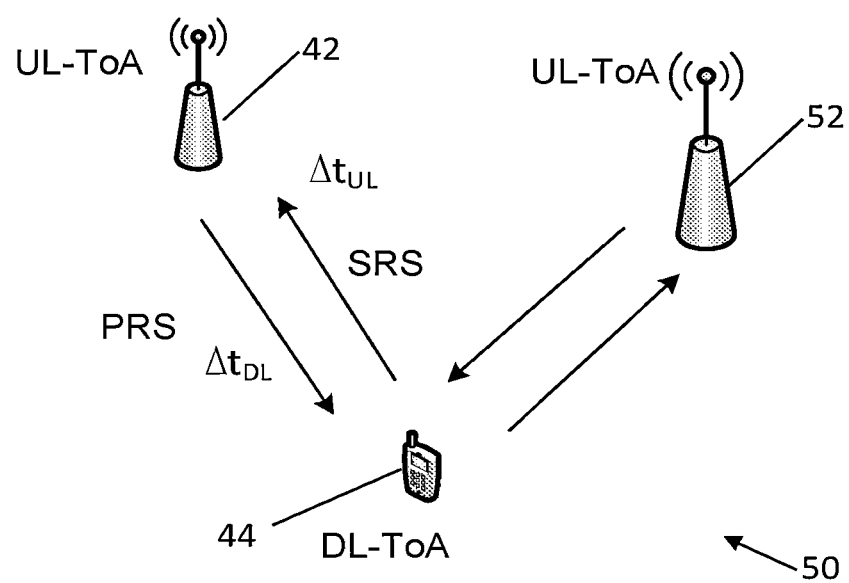

FIG. 5 is a block diagram of a system, indicated generally by the reference numeral 50, in accordance with an example embodiment. The system 50 comprises the first communication node 42 and the first user device 44 of the system 40 described above and further comprises a second communication node 52. Both the first and second communication nodes 42 and 52 are in two-way communication with the user device 44, thereby enabling further time difference data to be obtained.

The system 50 enables more positioning data to be obtained (and compared) and may therefore be more accurate than the system 40. Clearly, more than two communication nodes could be provided.

Figure 6:
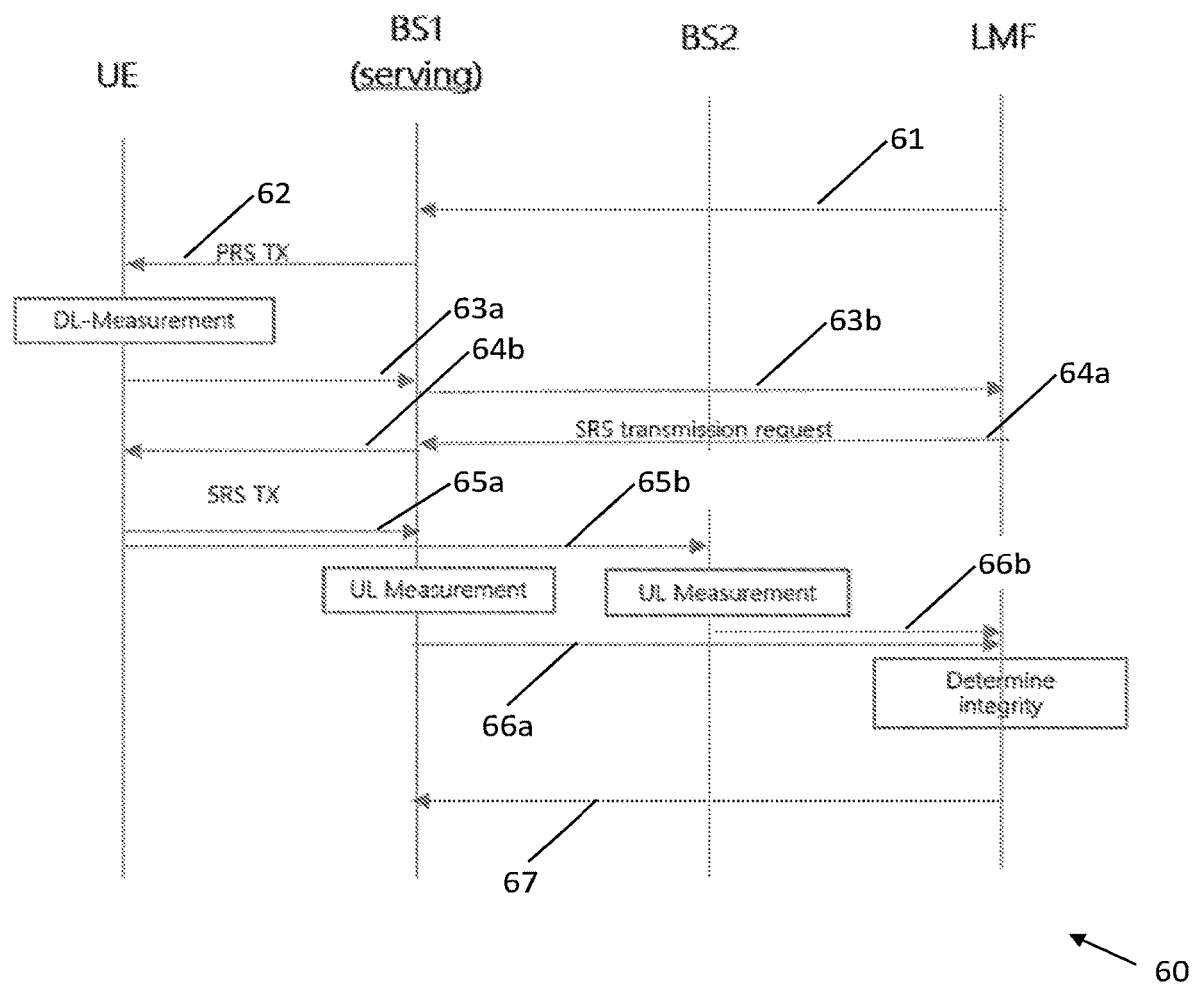
FIGS. 6 and 7 are message flow sequences in accordance with example embodiments.

FIG. 6 is a message flow sequence, indicated generally by the reference numeral 60, in accordance with an example embodiment. The message flow sequence 60 is an example implementation of the algorithm 30 described above and may be implemented using the system 50.

The message flow sequence 60 shows messages transmitted between a first user device UE (such as the first user device 44), a first (serving) base station BS1 (such as the first communication node 42), a second base station BS2 (such as the second communication node 52) and a location management function LMF. The second base station BS2 may be a neighbour base station.

The message flow sequence 60 starts with the LMF sending configuration instructions 61 to the first communication node BS1 (and optionally to the second communication node BS2) requesting measurement reports, such as the measurement reports discussed above with reference to the algorithm 30.

In response to the message 61, the serving base station BS1 sends a positioning reference signal (PRS) to user devices served by the BS1, including the first user device UE.

On receipt of the PRS signal, the first user device UE determines a downlink (DL) measurement (such downlink time delay or time of arrival data) and provides that DL measurement to the serving base station in a message 63a. That downlink data is provided by the serving base station to the LMF in a message 63b. The receipt of the message 63b at the LMF is an example of the operation 32 of the algorithm 30 described above.

The LMF also sends an SRS transmission request message 64a to the serving base station BS1, which transmission request is sent by the serving base station to the first user device UE in a message 64b. In response, the UE provides a sounding reference signal (SRS) transmission that is received at the serving base station BS1 (message 65a) and is also received at the second base station BS2 (message 65b).

Both the serving base station BS1 and the second base station BS2 generate uplink measurements (e.g. uplink time difference of arrival measurements) based on the received SRS transmissions from both the first user device and the second user device. First uplink measurements are sent by the serving base station to the LMF in message 66a and second uplink measurement are sent by the second base station BS2 to the LMF in message 66b. The receipt of the message 66a at the LMF is an example of the operation 34 of the algorithm 30 described above.

The location management function LMF determines an integrity of the measurement data for each user device based on a comparison of said uplink and downlink measurement data received in the messages 63b, 66a and 66b. An integrity verification notification (such as a flag) may be set by the LMF based on the determined integrity and may be provided to the serving base station BS1 as an integrity verification notification signal 67.

Figure 7:
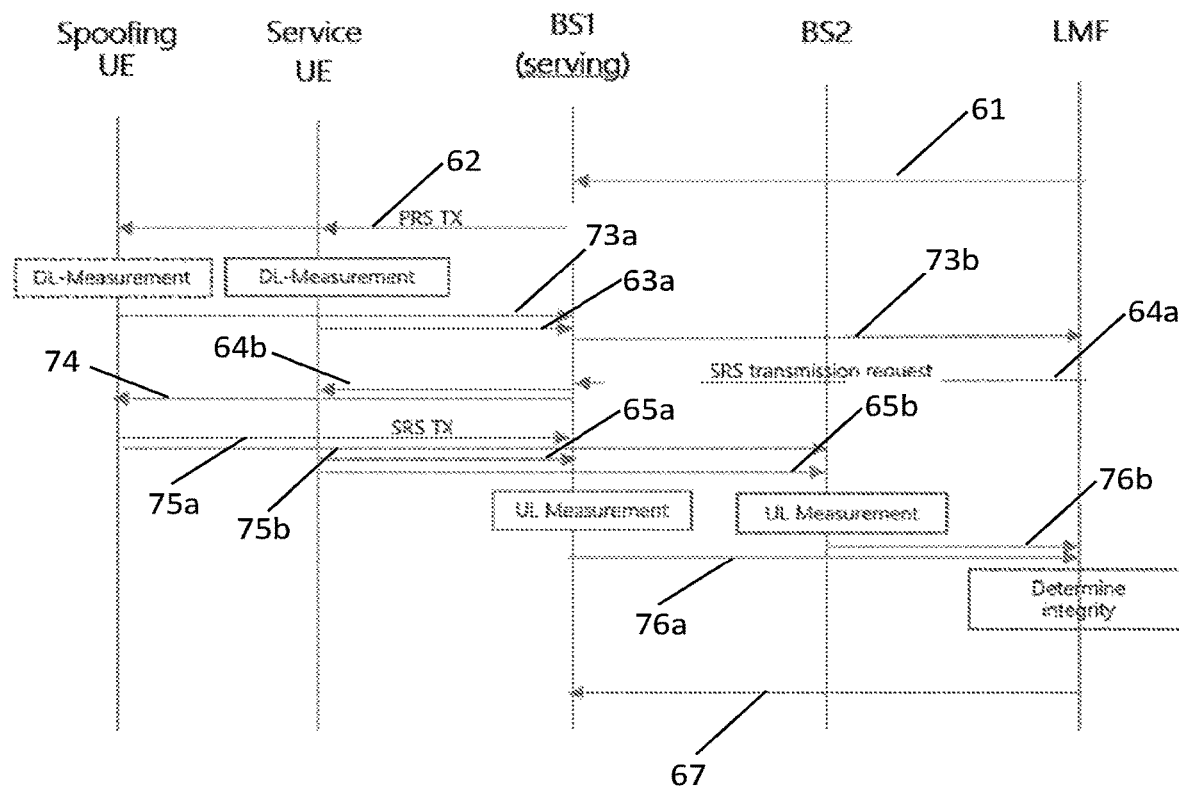

FIG. 7 is a message flow sequence, indicated generally by the reference numeral 70, in accordance with an example embodiment. The message flow sequence 70 shows messages transmitted between the first (serving) user device UE, the first (serving) base station BS1, the second base station BS2 and the location management function LMF of the message flow sequence 60 and a second user device. The second user device is a malicious user device.

The message flow sequence 70 starts with the LMF sending the configuration instructions 61 to the first communication node BS1 (and optionally to the second communication node BS2) requesting measurement reports, such as the measurement reports discussed above with reference to the algorithm 30.

In response to the message 61, the serving base station BS1 sends a positioning reference signal (PRS) to user devices served by the BS1, including the first user device and the second user device.

On receipt of the PRS signals, the first user device determines a downlink (DL) measurement are provides that DL measurement to the serving base station in the message 63a discussed above. Similarly, the second user device provides DL measurement data to the serving base station in a message 73a. The downlink measurement data provided by the second user device in the message 73a may be faked or falsified in some way.

That downlink data received by the serving base station in the messages 63a and 73a are provided to the LMF in a message 73b. The receipt of the message 73b at the LMF is an example of the operation 32 of the algorithm 30 described above.

The LMF also sends the SRS transmission request message 64a to the serving base station BS1, which transmission request is sent by the serving base station to the first user device in the message 64b and to the second user device in a message 74.

In response to the SRS transmission request, the first UE provides a sounding reference signal (SRS) transmission that is received at the serving base station BS1 (message 65a) and is also received at the second base station BS2 (message 65b). Similarly, the second user device provides an SRS transmission that is received at the serving base station (message 75a) and is also received at the second base station BS2 (message 75b)

Both the serving base station BS1 and the second base station BS2 generate uplink measurements (e.g. uplink time difference of arrival measurements) based on the received SRS transmission. First uplink measurements are sent by the serving base station to the LMF in message 76a and second uplink measurement are sent by the second base station BS2 to the LMF in message 76b. The receipt of the message 66a at the LMF is an example of the operation 34 of the algorithm 30 described above.

The location management function LMF determines an integrity of the measurement data based on a comparison of said uplink and downlink measurement data for both user devices received in the messages 73b, 76a and 76b. An integrity verification notification (such as a flag) may be set for each user device by the LMF based on the determine integrity and may be provided as to the serving base station BS1 as an integrity verification notification signal 67.

Figure 8:
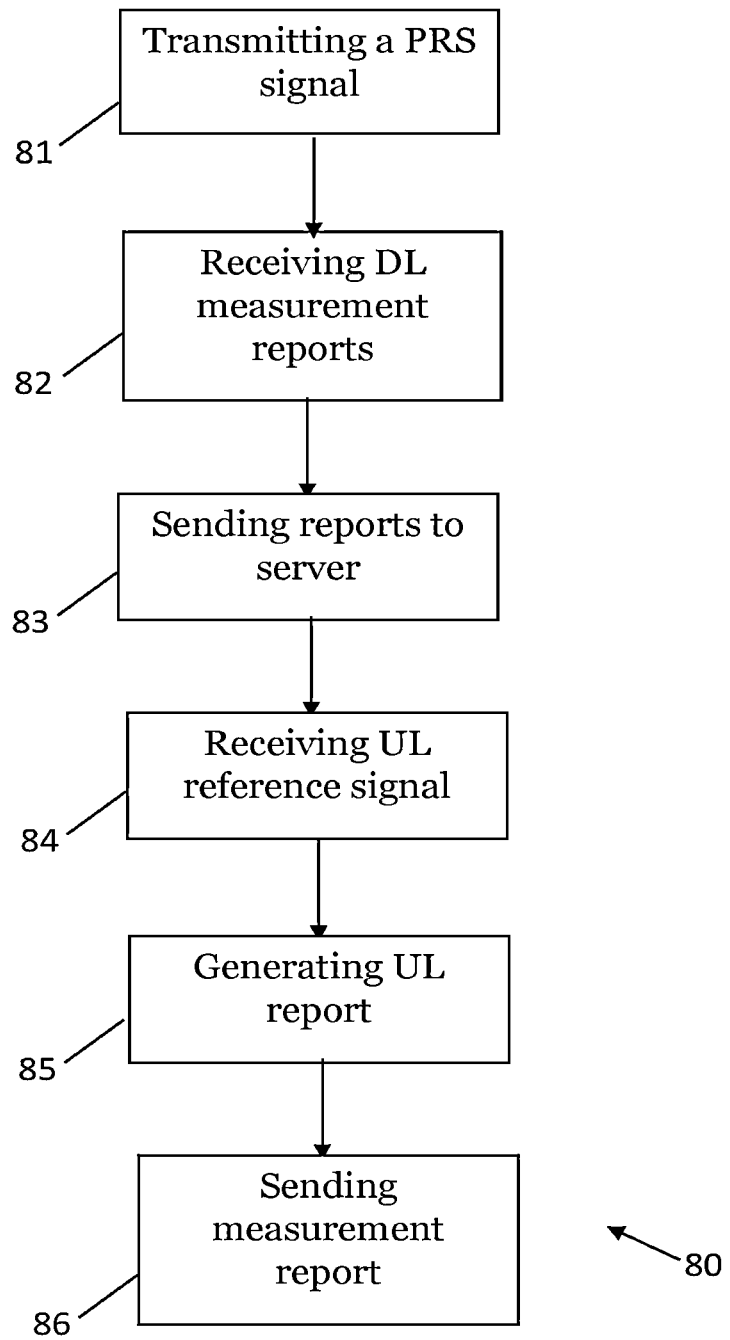
FIG. 8 is a flow chart showing an algorithm in accordance with an example embodiment.

The algorithm 30, as described above with reference to FIG. 3, may be implemented at the location management function of the message flow sequences 60 and 70 described above. FIG. 8 is a flow chart showing an algorithm, indicated generally by the reference numeral 80, in accordance with an example embodiment. The algorithm 80 may be implemented at a communication node, such as the serving base station BS1 of the message flow sequences 60 and 70.

The algorithm 80 starts at operation 81, where a positioning reference signal (PRS) is transmitted by a communication node.

At operation 82, one or more downlink measurement report(s) are received at the communication node from one or more user devices. The downlink measurement report(s) include downlink measurement data generated at a user device in response to the positioning reference signal transmitted in the operation 81. The downlink measurement data may be based on time delay data, but other data may be used, such as angle data, as discussed further below.

At operation 83, a first measurement report is sent to a server (e.g. a location management server). The first measurement report includes the downlink measurement report(s) received in the operation 82.

At operation 84, an uplink reference signal transmission (e.g. a sounding reference signal) is received from the user device(s). In response to the receive uplink reference signal(s), an uplink measurement report is generated at operation 85. The uplink measurement report includes uplink measurement data generated in response to the received uplink reference signal(s).

Finally, at operation 86, a measurement report is sent to the server (e.g. the LMF), wherein the second measurement report includes the uplink measurement report generated in the operation 85.

The user of uplink and downlink timing data is not the only mechanism by which positioning and position integrity can be verified. For example, angle or arrival (AoA) and/or angle of departure (AoD) data may be used in the algorithms 30 and 80, as discussed in detail below.

Figure 9:
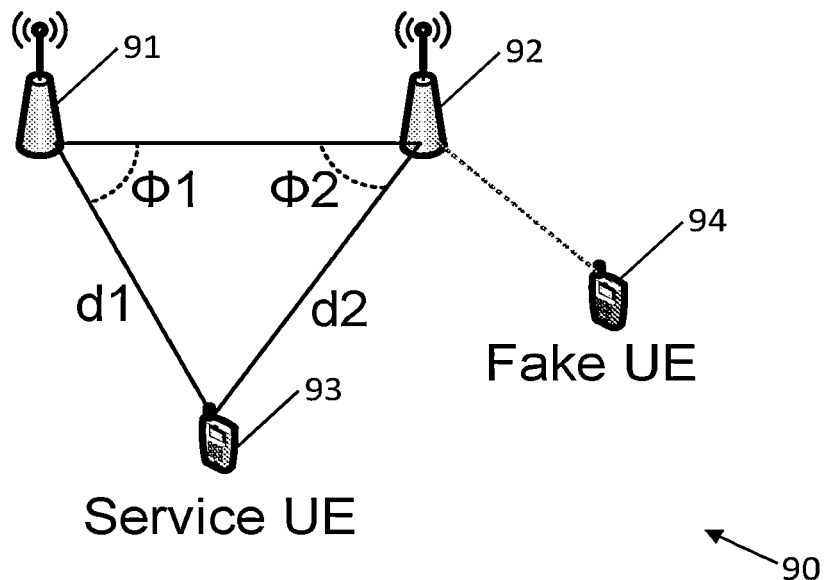
FIG. 9 is a block diagram of a system in accordance with an example embodiment.

FIG. 9 is a block diagram of system, indicated generally by the reference numeral 90, in accordance with an example embodiment.

The system 90 comprises a first communication node 91 and a second communication node 92 (similar to the first and second communication nodes 42 and 52 described above). The system 90 further comprises a first user device 93 (similar to the first user device 44 described above) and may comprise malicious (or fake) user device 94. Both the first and second communication nodes 91 and 92 are in two-way communication with the first user device 93 (and may be in two-way communication with the malicious user device 94).

As shown in FIG. 9, transmissions from the first user device 93 arrive at the first communication node 91 at a first angle Ø1, and arrive at the second communication node 92 at a second angle Ø2. Those angles are the angles of arrival (AoA) of the respective transmissions.

As also shown in FIG. 9, the distance between the first communication node 91 and the first user device 93 is given by d1 and the distance between the second communication node 92 and the first user device 93 is given by d2.

A location management function (such as the LMF 24 of the system 20) can investigate the angle and distance data relating to a user device using triangle rules, as discussed further below.

Figure 10:
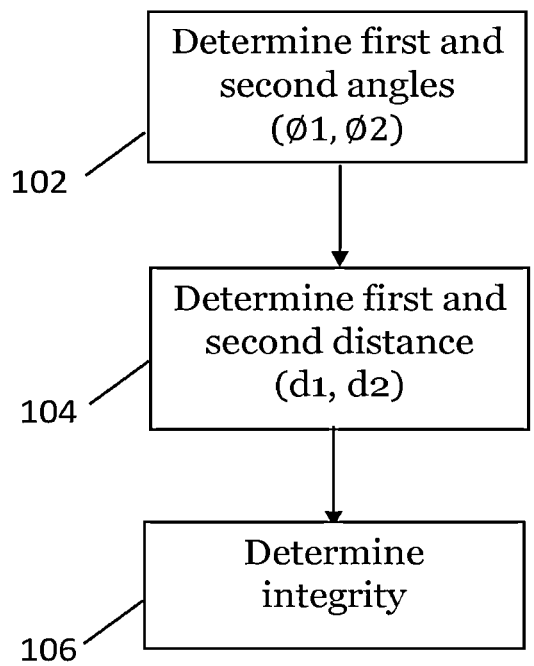
FIG. 10 is a flow chart showing an algorithm in accordance with an example embodiment.

FIG. 10 is a flow chart showing an algorithm, indicated generally by the reference numeral 100, in accordance with an example embodiment. The algorithm 100 may be implemented using the system 90 described above.

The algorithm 100 starts at operation 102, where the first angle Ø1 between the user device, the first communication node and the second communication node is determined and the second angle Ø2 between the user device, the second communication node and the first communication node is determined. The first and second angles may be based on angle of arrival and/or angle of departure data.

At operation 104, a first distance (d1) between the first communication node and the user device is determined and a second distance (d2) between the second communication node and the user device is determined. The first and second distances may be determined based on time delay data, as discussed further below.

At operation 106, an integrity of the measurement data determined in the operations 102 and 104 may be determined based on whether the first and second angles and the first and second distances are consistent.

Whether the angles and the distances are consistent may be based on whether a difference between a ratio of the sine of the first angle and the second distance and a ratio of the sine of the second angle and the first distance is below a second threshold, for example in accordance with the following equation:

$$\text{verification flag} = \text{boolean}\left(\left|\frac{\sin\phi_1}{\Delta t2} - \frac{\sin\phi_2}{\Delta t1}\right| < \varepsilon\right) \quad (2)$$

where Δt1, Δt2 are absolute travel times between a communication node and the relevant user device and are therefore indicative of the distances d1 and d2 described above. In some example embodiments, the time of arrival measurements may be made in terms of time difference or RX time stamps and the absolute travel time are separately calculated. If DL/UL transmission are available for time measurements, round-trip time (RTT) measurement gives absolute travel time. Alternatively, if timing advance values are available, the network can know TX time stamp at UE side (i.e. Δt=(RX time stamp−TX time stamp)).

A location management function (LMF) can directly apply the measurements outlined above as part of a checking algorithm. As described above, a malicious used device might seek to fake or conceal its locations. If so, it may be difficult for the malicious used device to provide data to the communication nodes that will result in the equation (2) above being satisfied.

It should be noted that the test in (2) set out above is applicable as long as the malicious user device 94 transmits a signal. It does not require any measurements from the malicious user device 94 side that may want to hide itself.

The principles described above with reference to the system 90 may be used in the algorithm 30 described above. The uplink and downlink measurement data received in the operation 32 may include angle of arrival and angle of departure data. The integrity of the measurement data may be determined in the operation 36 based (at least in part) on whether the angle of arrival and angle of departure data are consistent, as discussed above.

Figure 11:
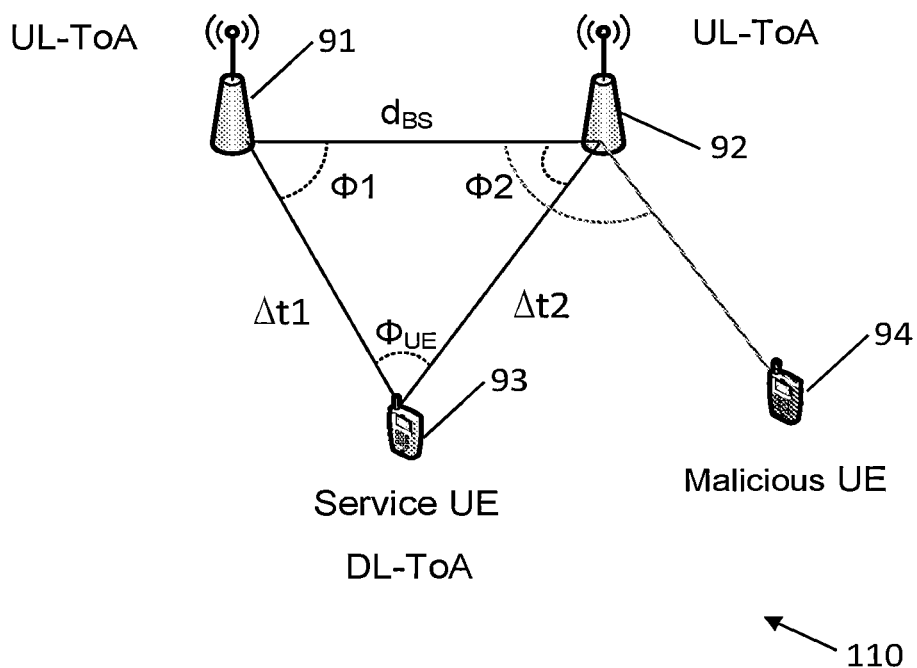
FIG. 11 is a block diagram of a system in accordance with an example embodiment.

FIG. 11 is a block diagram of a system, indicated generally by the reference numeral 110, in accordance with an example embodiment.

The system 110 comprises the first communication node 91, the second communication node 92 and the first user device 93 described above and may comprise the malicious (or fake) user device 94 described above. Both the first and second communication nodes 91 and 92 are in two-way communication with the first user device 93 (and may be in two-way communication with the malicious user device 94).

As shown in FIG. 11, transmissions from the first user device 93 arrive at the first communication node 91 at a first angle Ø1, and arrive at the second communication node 92 at a second angle Ø2. Those angles are the angles of arrival (AoA) of the respective transmissions at the communication nodes. Further, an angle between the first communication node, the first user device and the second communication node is labelled as $\emptyset_{UE}$. The angle $\emptyset_{UE}$ may be determined based on angle of arrival and/or angle of departure data at the first user device 93.

The distance between the first communication node 91 and the first user device 93 is expressed as Δt1 and the distance between the second communication node 92 and the first user device 93 is expressed as Δt2.

Figure 12:
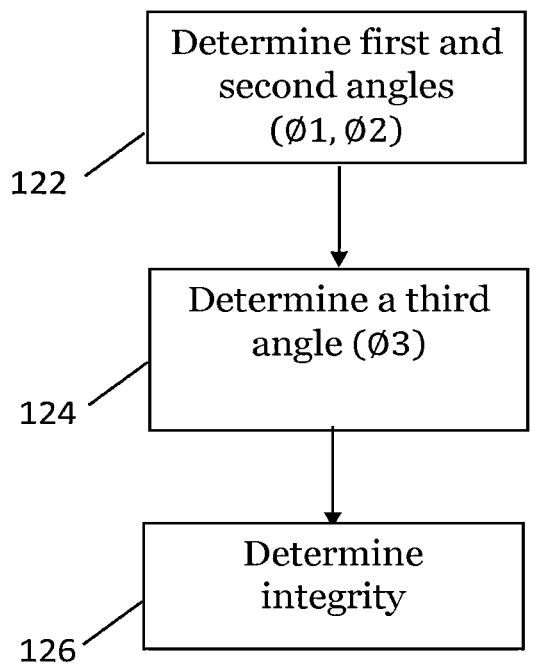
FIGS. 12 and 13 are flow charts showing algorithms in accordance with example embodiments.

FIG. 12 is a flow chart showing an algorithm, indicated generally by the reference numeral 120, in accordance with an example embodiment. The algorithm 120 may be implemented using the system 110 described above.

The algorithm 120 starts at operation 122, where a first angle Ø1 between the user device, the first communication node and the second communication node is determined and a second angle Ø2 between the user device, the second communication node and the first communication node is determined. The first and second angles may be based on angle of arrival and/or angle of departure data.

At operation 104, a third angle $\emptyset_{UE}$ between the first communication node, the user device and the second communicate node is determined. The third angle may be determined based on angle of arrival and/or angle of departure data at the respective user device.

At operation 106, an integrity of the measurement data determined in the operations 102 and 104 may be determined based on whether the first, second and third angles sum up to 180 degrees to within a defined tolerance or threshold. This may be expressed as follows:

verification flag=boolean(|Ø1+Ø2+$\emptyset_{UE}$−180|<ε)    (3)

As described above, a malicious used device might seek to fake or conceal its locations. If so, it may be difficult for the malicious used device to provide data to the communication nodes that will result in the equation (3) above being satisfied.

In the event that an integrity determination identifies a malicious device, an attempt may be made to determine a true location of that device. In this way, a malicious (or suspected malicious) device may be tracked.

Figure 13:
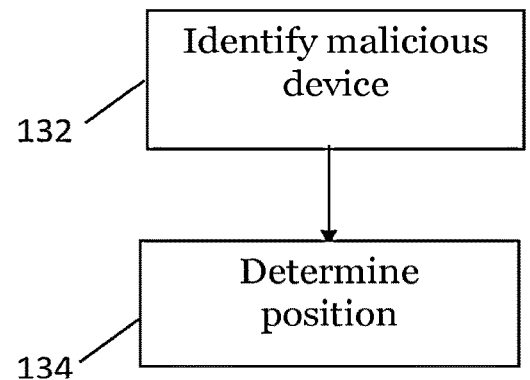

FIG. 13 is a flow chart showing an algorithm, indicated generally by the reference numeral 130, in accordance with an example embodiment.

The algorithm 130 starts at operation 132, where a malicious device is identified. For example, one or more of the algorithms described above may be used to identify a malicious device.

At operation 134, a position estimate for the device identified at the operation 132 is determined. As described further below, the position estimate obtained in the operation 134 may be based on data that is difficult to fake or spoof (such as angle of arrival data for signals received at a communication node from the malicious (or a suspected malicious) device).

Figure 14:
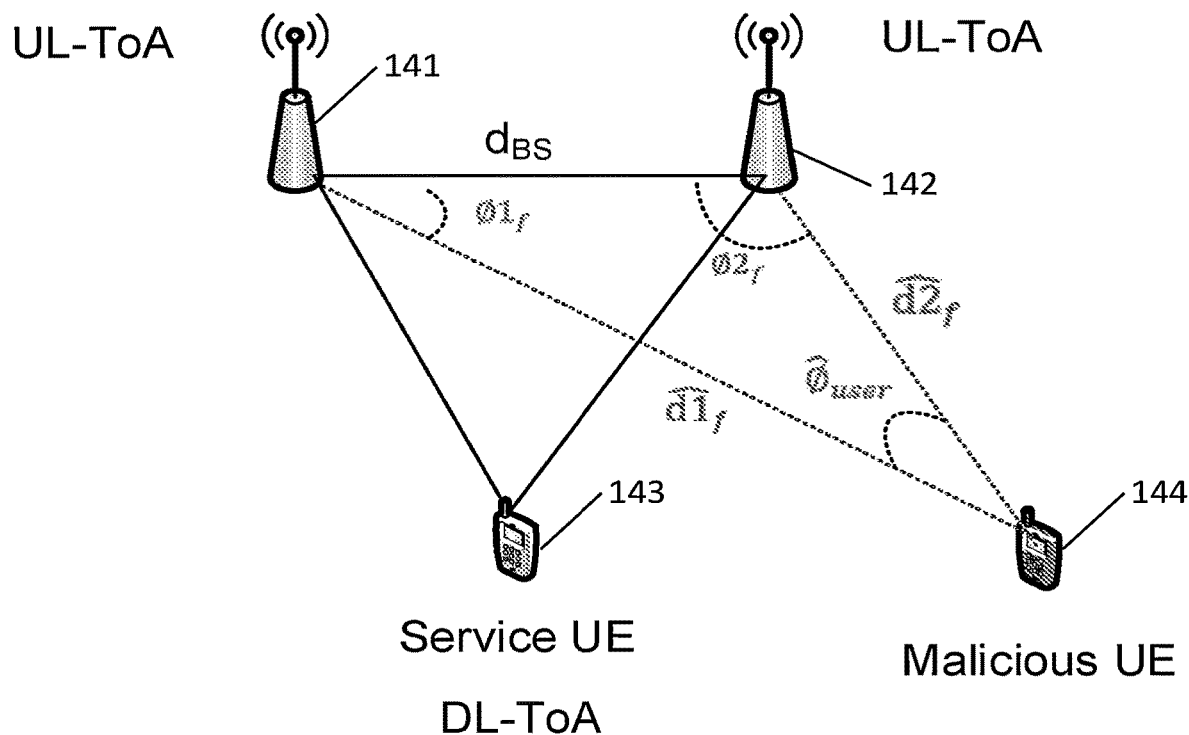
FIG. 14 is a block diagram of a system in accordance with an example embodiment.

FIG. 14 is a block diagram, indicated generally by the reference numeral 140, of a system in accordance with an example embodiment.

The system 140 comprises a first communication node 141 and a second communication node 142 (similar to the first and second communication nodes 91 and 92 described above). The system 140 further comprises a first user device 143 (similar to the first user device 93 described above) and may comprise a malicious user device 144 (similar to the device 94 described above). Both the first and second communication nodes 141 and 142 are in two-way communication with the first user device 143 and the malicious user device 144.

Let $\emptyset 1_f$ denote the angle of arrival (AoA) of communications from the malicious user device 144 at the first communication node 141, $\emptyset 2_f$ denote the angle of arrive of communications from the malicious user device 144 at the second communication node 142, and $d_{BS}$ denote the distance between the first and second communication nodes. Using the triangle rules in (1), (2), we can estimate the corresponding distances between the user device 144 and the respective communication nodes as:

$$\hat{d1}_f = \frac{\sin(\emptyset 1) \times d_{BS}}{\sin(180 - \emptyset 1f - \emptyset 2f)} \quad (4)$$

$$\hat{d2}_f = \frac{\sin(\emptyset 2) \times d_{Bs}}{\sin(180 - \emptyset 1f - \emptyset 2f)}$$

Where (as shown in FIG. 14):

$\hat{d1}_f$ is the distance between the malicious user device 144 and the first communication node 141; and $\hat{d2}_f$ is the distance between the malicious user device 144 and the second communication node 142.

In this way, an estimate of the position of the malicious (or suspected malicious) user device 144 can be determined based only on angle of arrival data determined at the first and second communication nodes (which data are difficult to fake or spoof) and the distance between the first and second communication nodes (which distance is typically know precisely).

Figure 15:
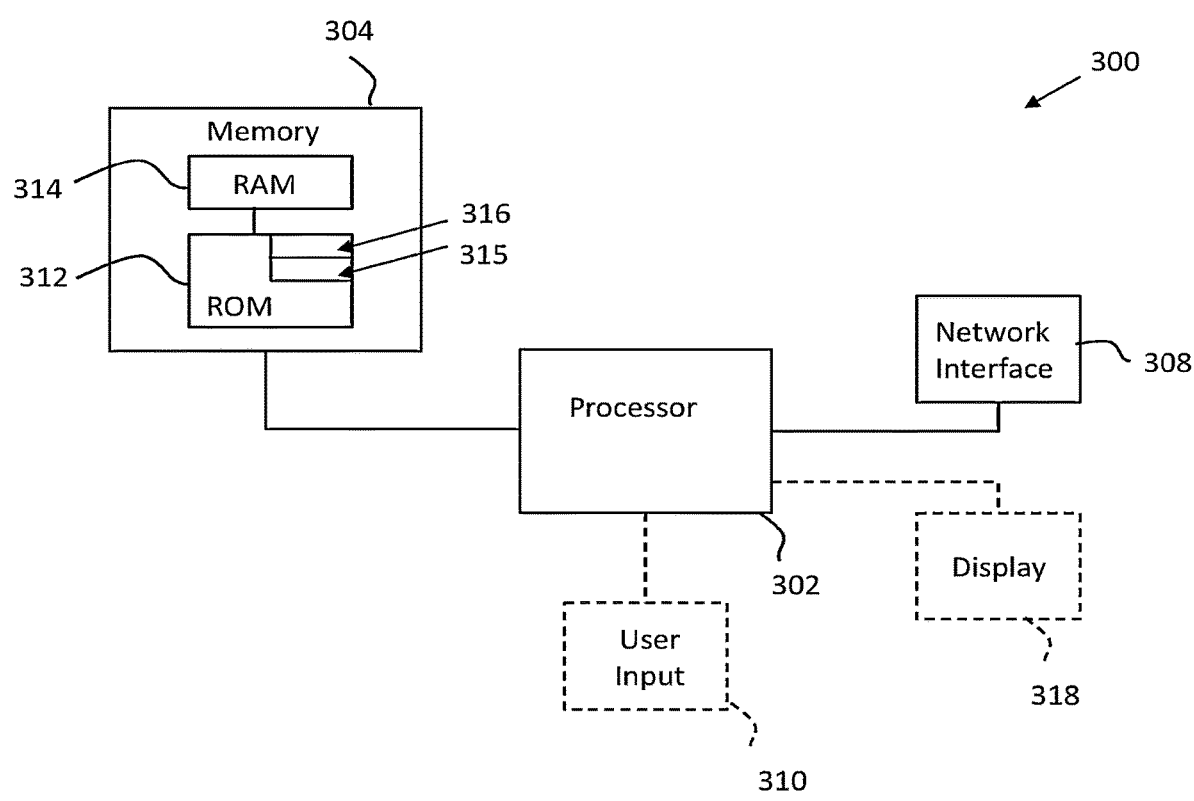
FIG. 15 is a block diagram of components of a system in accordance with an example embodiment.

For completeness, FIG. 15 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message flow sequences 30, 60, 70, 80, 100, 120 and 130 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16A:
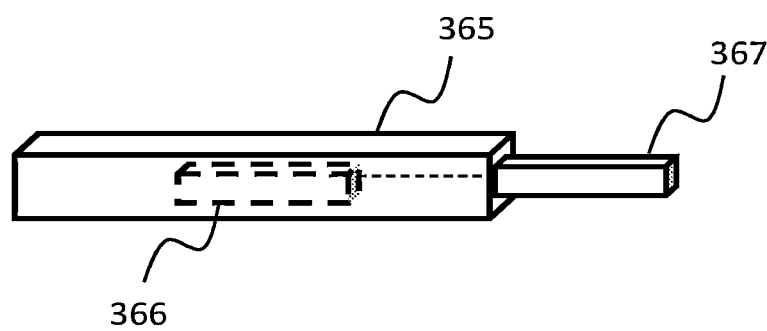
FIGS. 16A and 16B show tangible media, respectively a removable non-volatile memory unit and a compact disc (CD) storing computer-readable code which when run by a computer perform operations according to example embodiment.
Figure 16B:
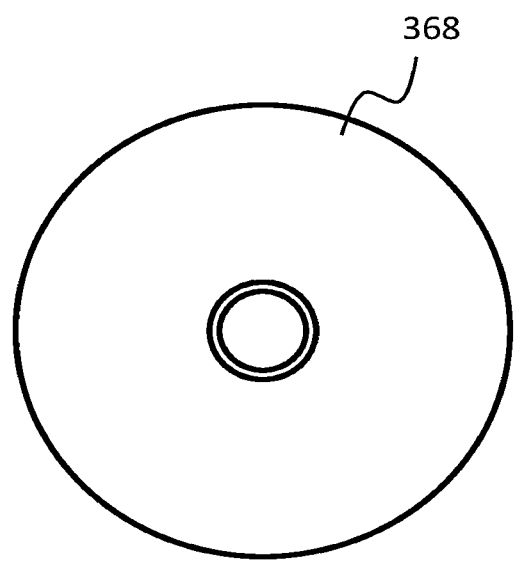

FIGS. 16A and 16B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message flow sequences of FIGS. 3, 6, 7, 8, 10, 12 and 13 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
    at least one processor; and
    at least one memory storing instructions that, when executed by the at least one processor, cause the apparatus at least:
    receive a first measurement report from a first communication node of a mobile communication system, wherein the first measurement report includes downlink measurement data generated at a user device in response to a positioning reference signal sent by the first communication node;
    receive a second measurement report from the first communication node, wherein the second measurement report includes uplink measurement data generated at the first communication node in response to an uplink reference signal sent by the user device;
    determine an integrity of the measurement data based on whether the measurement data is reliable, wherein the reliability of the measurement data is based on whether the uplink and downlink measurement data are consistent, wherein the downlink measurement data includes downlink time delay or time of arrival data and the uplink measurement data includes uplink time delay or time of arrival data, and the integrity of the measurement data is determined based on whether the uplink and downlink time delay or time of arrival data are consistent; and
    set an integrity verification notification in accordance with the determined integrity.

2. An apparatus as claimed in claim 1, wherein determining whether the downlink time delay or time of arrival and the uplink time delay or time of arrival data are consistent comprises determining whether a difference between the downlink time delay or time of arrival and the uplink time delay or time of arrival is below a first threshold.

3. An apparatus as claimed in claim 1, wherein:
    the uplink and downlink measurement data include angle of arrival and angle of departure data; and
    determining the integrity of the measurement data determines whether the angle of arrival and angle of departure data are consistent.

4. An apparatus as claimed in claim 1, wherein the instructions, when executed by the at least one processor, further cause the apparatus at least to:
    receive a third measurement report from a second communication node of the mobile communication system, wherein the third measurement report includes uplink measurement data generated at the second communication node in response to the uplink reference signal sent by the user device,
wherein the first measurement report includes downlink measurement data generated at the user device in response to a positioning reference signal sent by the second communication node.

5. An apparatus as claimed in claim 4, wherein the instructions, when executed by the at least one processor, further cause the apparatus at least to:
determine a first angle between the user device, the first communication node and the second communication node;
determine a second angle between the user device, the second communication node and the first communication node;
determine a first distance between the first communication node and the user device; and
determine a second distance between the second communication node and the user device,
wherein determining the integrity of the measurement data determines whether the first and second angles and the first and second distances are consistent.

6. An apparatus as claimed in claim 4, wherein the instructions, when executed by the at least one processor, further cause the apparatus at least to:
determine a first angle between the user device, the first communication node and the second communication node;
determine a second angle between the user device, the second communication node and the first communication node; and
determine a third angle between the first communication node, the user device and the second communication node,
wherein determining the integrity of the measurement data determines said integrity based on a sum of the first, second and third angles.

7. An apparatus as claimed in claim 4, wherein the first communication node is a serving base station of the user device and the second communication node is a neighbour base station of the user device.

8. An apparatus as claimed in claim 1, wherein performing setting the integrity verification notification comprises setting an integrity verification notification signal.

9. An apparatus as claimed in claim 1, wherein the instructions, when executed by the at least one processor, further cause the apparatus at least to:
send configuration instructions to the first communication node to request said first and second measurement reports.

10. An apparatus as claimed in claim 1, wherein the instructions, when executed by the at least one processor, further cause the apparatus at least to:
estimate a position of the user device based on angles of arrival of transmissions from the user device at the first communication node and another communication node and the distance between the first communication node and said another communication node.

11. An apparatus, comprising:
at least one processor; and
at least one memory storing instructions that, when executed by the at least one processor, cause the apparatus at least:
transmit a positioning reference signal;
receive a downlink measurement report from a user device, wherein the downlink measurement report includes downlink measurement data generated at a user device in response to the positioning reference signal;
send a first measurement report to a server, wherein the first measurement report includes said downlink measurement report;
receive an uplink reference signal transmission from the user device;
generate an uplink measurement report including uplink measurement data generated in response to the received uplink reference signal;
send a second measurement report to a server, wherein the second measurement report includes said uplink measurement report; and
receive an integrity verification notification signal, wherein the integrity verification notification signal is set by the user device in accordance with an integrity determined based on whether the measurement data is reliable, wherein the reliability of the measurement data is based on whether the uplink and downlink measurement data are consistent, wherein the downlink measurement data includes downlink time delay or time of arrival data and the uplink measurement data includes uplink time delay or time of arrival data, and the integrity of the measurement data is determined based on whether the uplink and downlink time delay or time of arrival data are consistent.

12. An apparatus as claimed in claim 11, wherein the integrity verification notification signal indicates whether a difference between the downlink time delay or time of arrival and the uplink time delay or time of arrival is below a first threshold.

13. An apparatus as claimed in claim 11, wherein the apparatus is a serving base station of the user device.

14. A method comprising:
receiving a first measurement report from a first communication node of a mobile communication system, wherein the first measurement report includes downlink measurement data generated at a user device in response to a positioning reference signal sent by the first communication node;
receiving a second measurement report from the first communication node, wherein the second measurement report includes uplink measurement data generated at the first communication node in response to an uplink reference signal sent by the user device;
determining an integrity of the measurement data based on whether the measurement data is reliable, wherein the reliability of the measurement data is based on whether the uplink and downlink measurement data are consistent, wherein the downlink measurement data includes downlink time delay or time of arrival data and the uplink measurement data includes uplink time delay or time of arrival data, and the integrity of the measurement data is determined based on whether the uplink and downlink time delay or time of arrival data are consistent; and
setting an integrity verification notification in accordance with the determined integrity.

15. The method as claimed in claim 14, wherein determining whether the downlink time delay or time of arrival and the uplink time delay or time of arrival data are consistent comprises determining whether a difference between the downlink time delay or time of arrival and the uplink time delay or time of arrival is below a first threshold.

16. The method as claimed in claim 14, wherein:
the uplink and downlink measurement data include angle of arrival and angle of departure data; and
determining the integrity of the measurement data determines whether the angle of arrival and angle of departure data are consistent.

17. The method as claimed in claim 14, further comprising:
receiving a third measurement report from a second communication node of the mobile communication system, wherein the third measurement report includes uplink measurement data generated at the second communication node in response to the uplink reference signal sent by the user device,
wherein the first measurement report includes downlink measurement data generated at the user device in response to a positioning reference signal sent by the second communication node.

* * * * *